Figure 4:
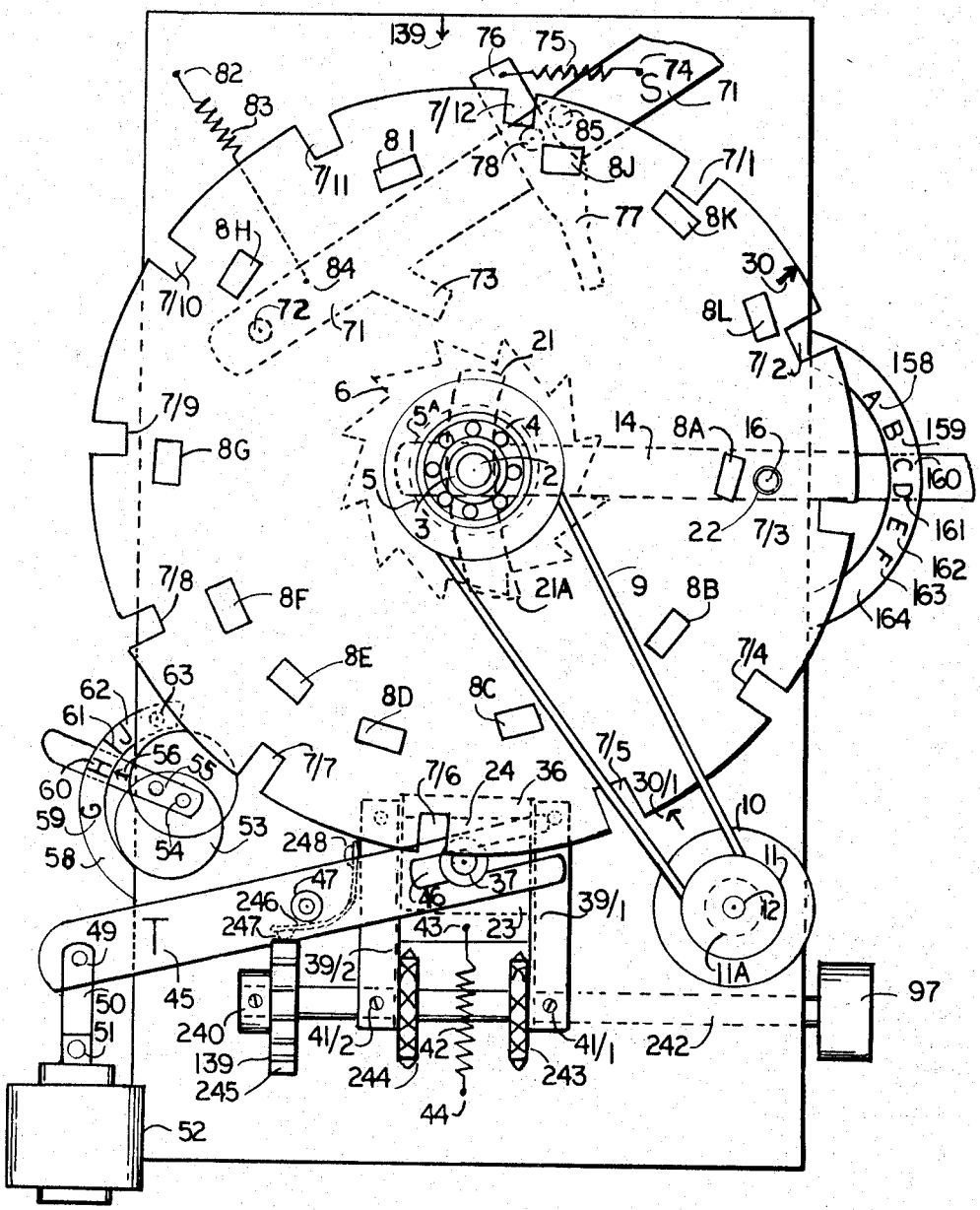

May 30, 1967  J. ADMON  3,322,035
PROJECTION OR DISPLAY OF STILL PICTURES AND TEXTS
Filed Dec. 4, 1963  7 Sheets-Sheet 1
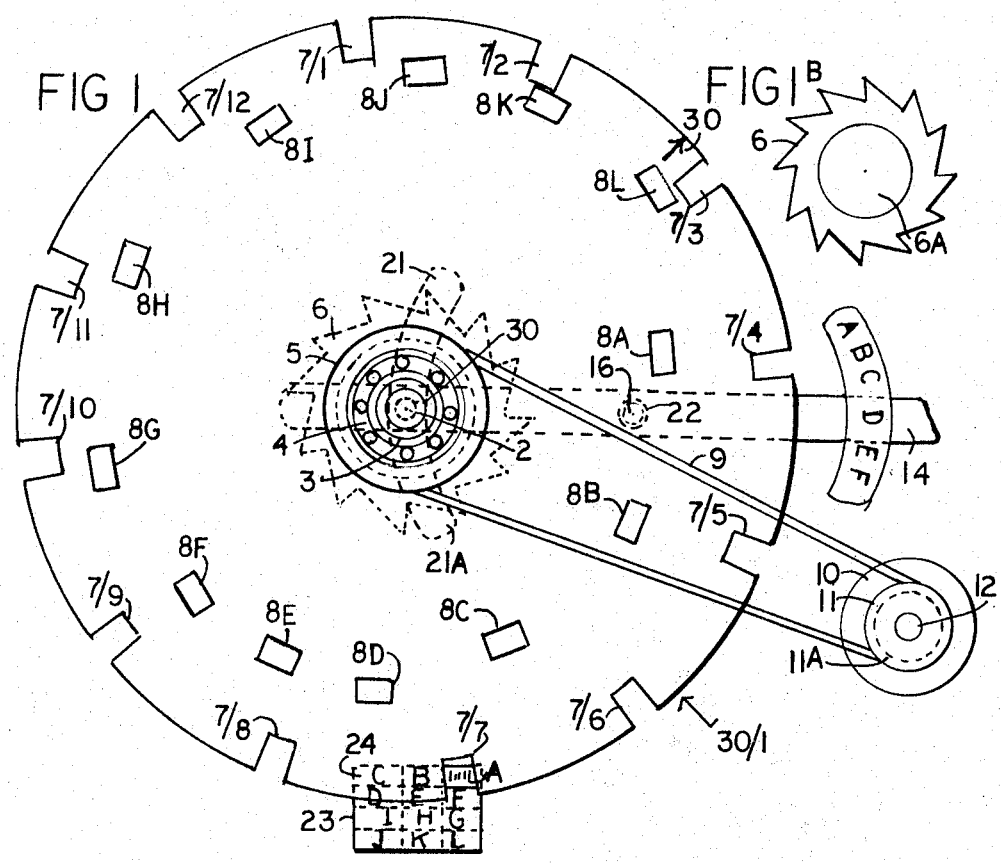
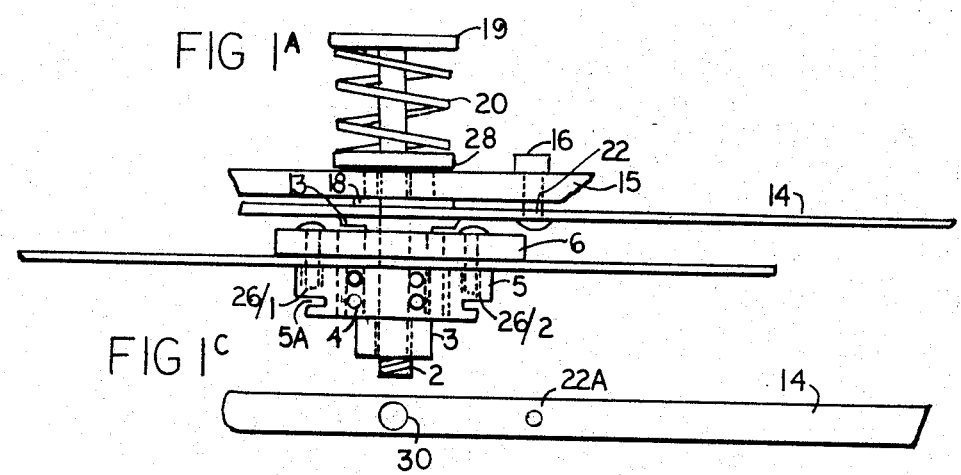
INVENTOR
Jedidiah Admon

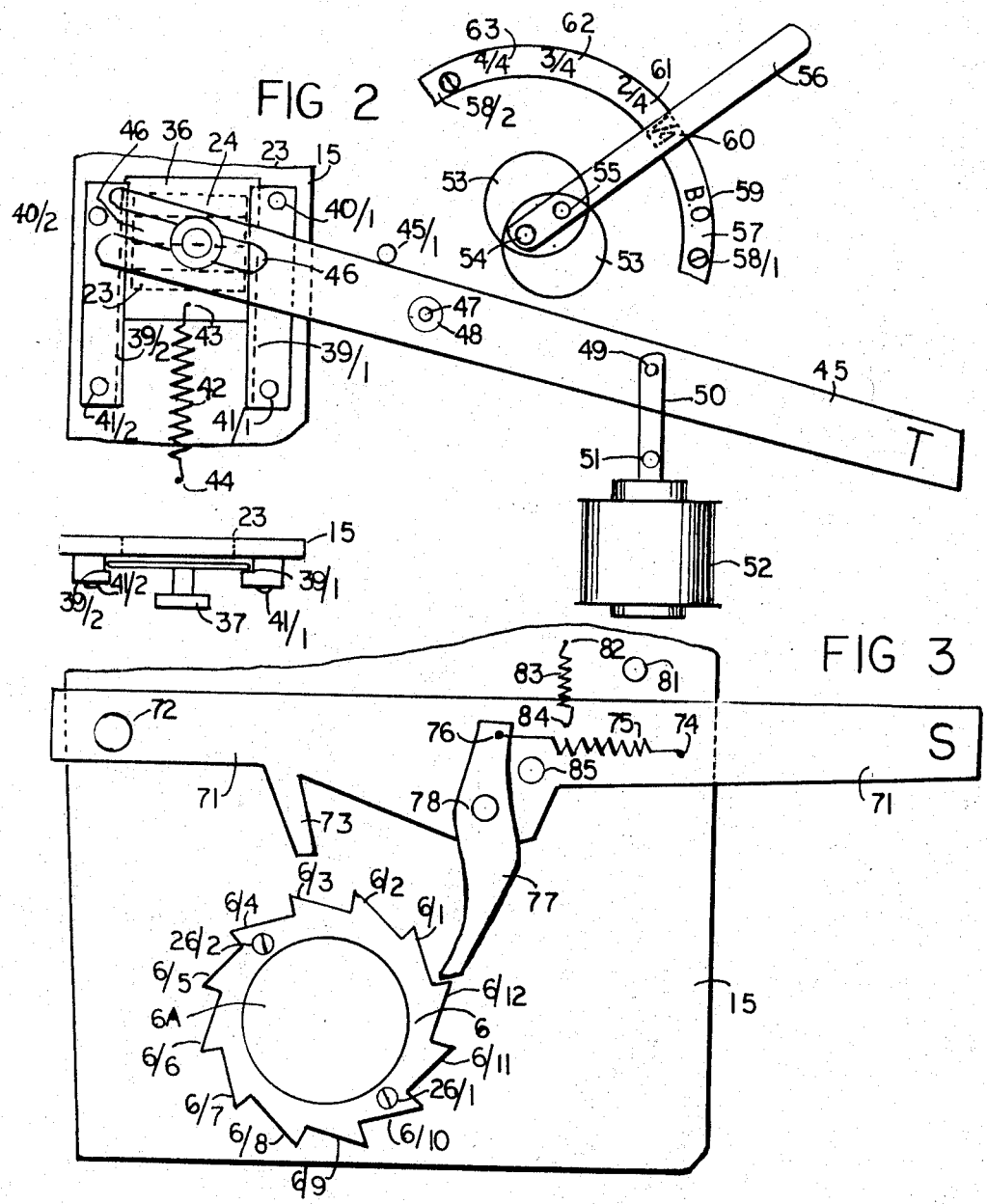

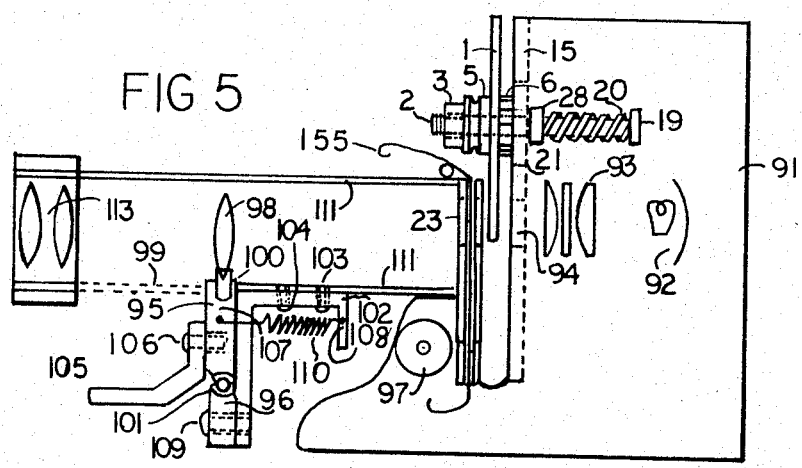
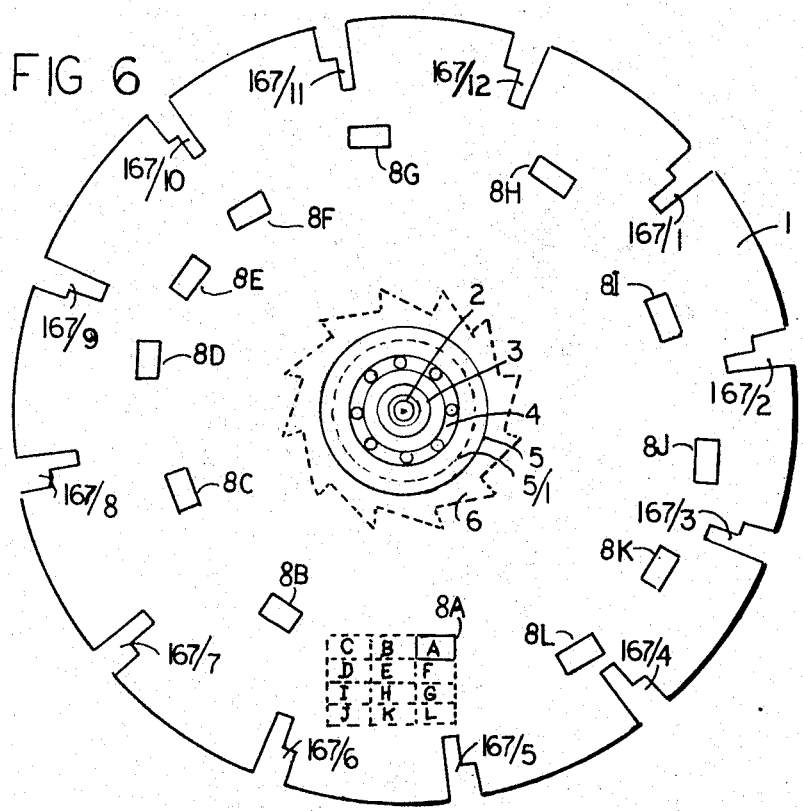

May 30, 1967 — J. ADMON — 3,322,035
PROJECTION OR DISPLAY OF STILL PICTURES AND TEXTS
Filed Dec. 4, 1963 — 7 Sheets-Sheet 5
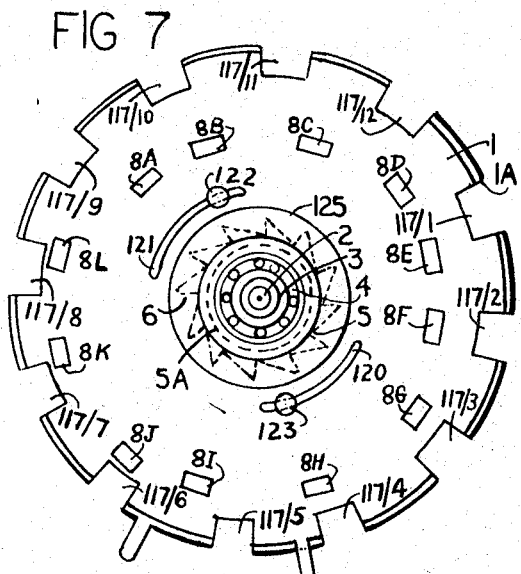
FIG 7
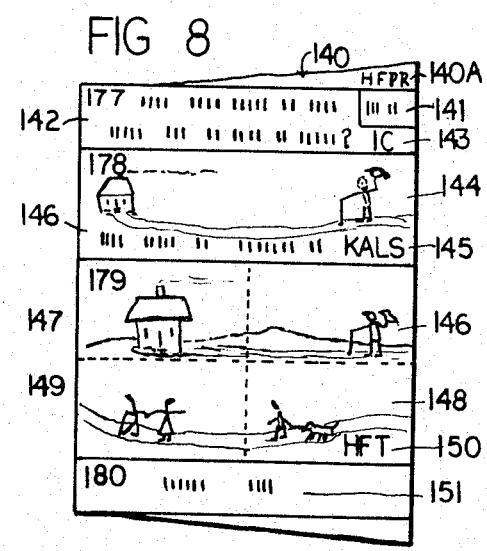
FIG 8
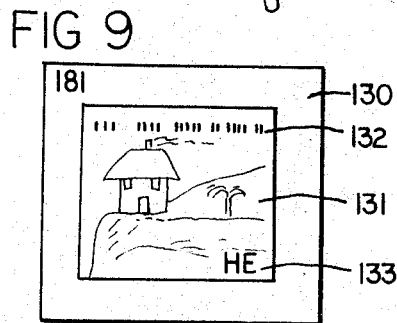
FIG 9
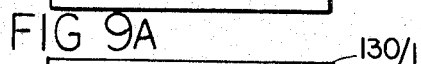
FIG 9A
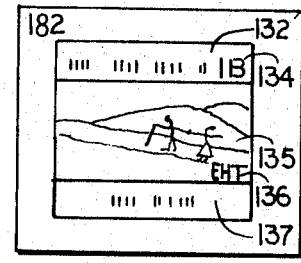
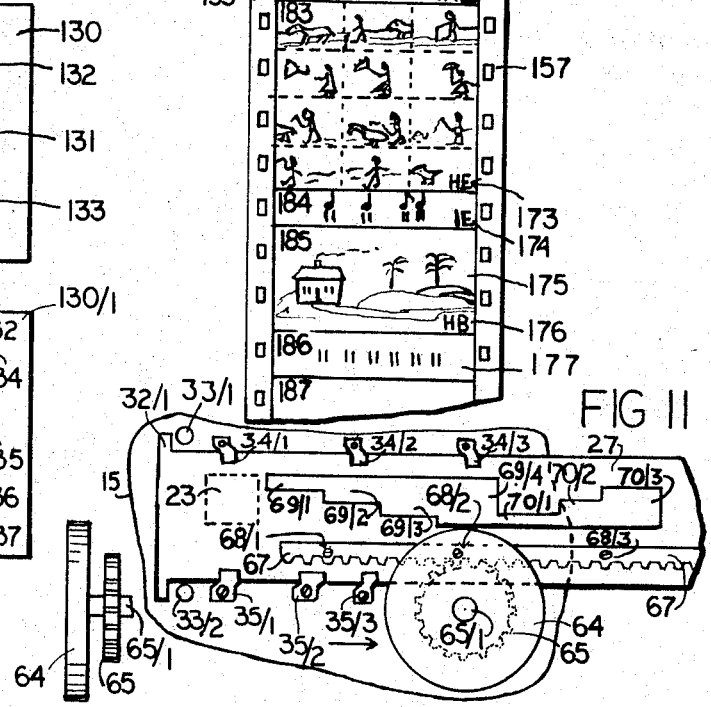
FIG 10
FIG 11
INVENTOR
Jedidiah Admon

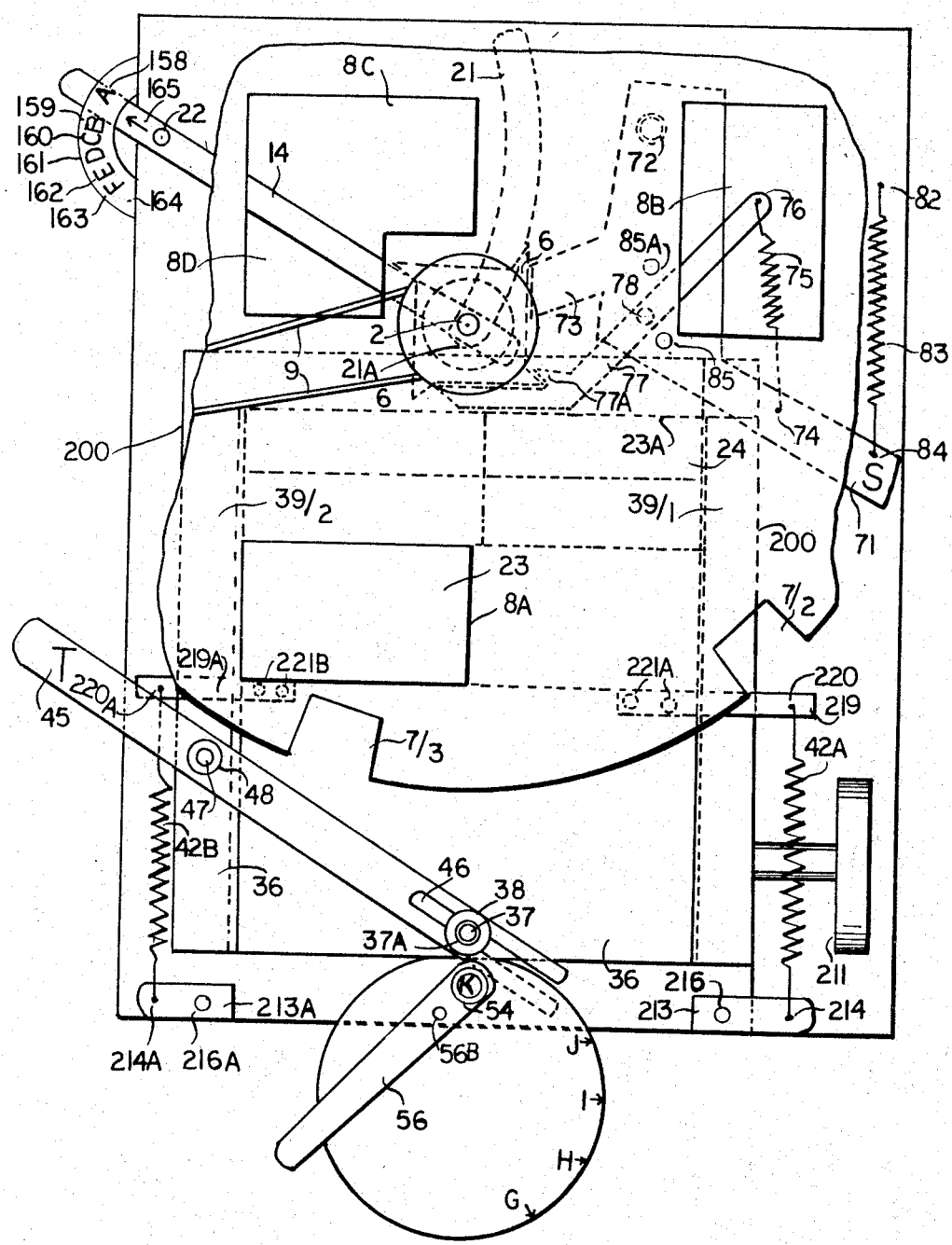

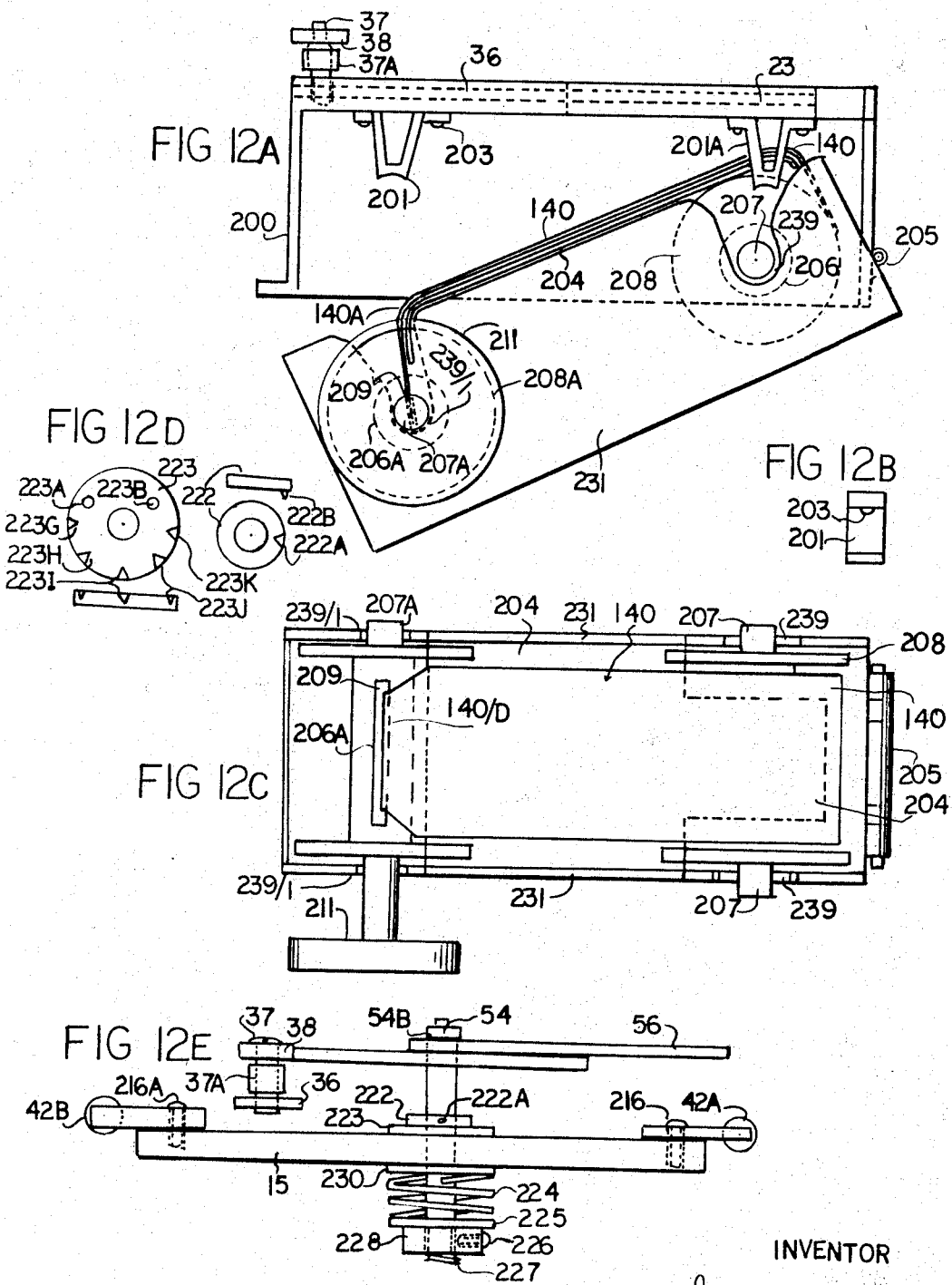

United States Patent Office 3,322,035
Patented May 30, 1967

3,322,035
PROJECTION OR DISPLAY OF STILL
PICTURES AND TEXTS
Jedidiah Admon, New York, N.Y., assignor to Variview
Reader Corporation, New York, N.Y.
Filed Dec. 4, 1963, Ser. No. 328,450
26 Claims. (Cl. 88—27)

The object of this invention is to introduce improvements and innovations in the art of projecting or displaying still pictures and texts, as used in the educational, entertainment and advertising fields.

It consists in a method and means for the combination of certain known functions, at present available on film strip or slide projectors, opaque projectors, picture viewers, teaching machines for programed instruction and similar, with the functions of a controlled reader and tachistoscope and with the new functions, disclosed herein and designated as variable field display and stepwise display appliance.

Further objects of this invention are:

(1) A still picture and text projection or display apparatus having also the functions of a controlled reader and/or a tachistoscope and/or a variable field display appliance and/or a stepwise display appliance.

(2) A carrier of subject matter for pictures or display by any of the said apparatuses, organized for the utilization of the various said functions.

(3) Foolproof, simple and inexpensive means to produce the said functions with the said apparatuses and said carrier.

(4) Enhancement of the educational, entertainment or advertising values of the subject matter by the use of the said combination of functions.

Another object of this invention is to introduce the application of the proposed combination of functions into low cost teaching machines, even in the form of toys, thus combining the child's urge to play with the interplay of the said combinations as a reinforcement for learning.

All the novel features, which I believe to be characteristic of my invention are set forth with particularity in the appended claims. My invention itself, however, both as to its organization and manner of construction and method of operation together with further objects and advantages thereof, may best be understood by reference to the following description taken in connection with the accompanying drawings in which FIG. 1 is a plane view of a rotatable member.

FIG. 1a is a side view of a rotatable member.
FIG. 1b is a view of a ratchet wheel.
FIG. 1c is a plane view of a lever.
FIG. 2 is a plane view of means for a variable field display appliance.
FIG. 3 is a plane view of means for a stepwise rotatable display appliance and tachistoscope.
FIG. 4 is a plane view of the combination of means for controlled reader, variable field display appliance and stepwise rotatable display appliance and tachistoscope.
FIG. 5 is a side view of a transparent mask tachistoscope.
FIG. 6 is a plane view of a rotatable member with composite apertures for controlled reader and stepwise rotatable display appliance.
FIG. 7 is a plane view of a rotatable member with variable apertures for controlled reader and stepwise rotatable display appliance.
FIG. 8 is a view of a paper carrier of subject matter.
FIGS. 9 and 9a are views of carriers of subject matter in the form of slides.
FIG. 10 is a view of a film strip as subject matter carrier.
FIG. 11 is a plane view of a variant for a variable field display appliance.
FIG. 12 is a plane view of a teaching machine.
FIG. 12a is a side view of the container of the subject matter carrier for a teaching machine.
FIG. 12b is a side view of pressure pad 201.
FIG. 12c is a plane view of same.
FIG. 12d is a plane view of parts of a cam assembly for a teaching machine.
FIG. 12e is a side view of a cam assembly for a teaching machine.

Turning now to the drawings it will be seen that FIGS. 1, 1a, b, c and d represent plane and side views of a rotatable member 1 with its accessories, which is movable around its center axis 2.

FIG. 1a: Axis 2 has at one end screw windings to receive upon it knob 3, and at the other end flange 19. Axis 2 goes thru ball bearing 4 which carries a pulley 5, shown with one groove 5a but which could have more than one. On the reverse side of rotatable member 1 there is a ratchet wheel 6 which is firmly attached to rotatable member 1 and to pulley 5 by screw 26/1 and 26/2. Ratchet wheel 6 is hollowed in its center 6a so as to avoid friction with washer 13 which, on one side, presses against center part of ball bearing 4, and on the other side against lever 14. This lever is held by cotter pin 16 in hole 22 of support 15. Center axis 2 goes thru washer 13 and hole 30 of lever 14, then thru oval slot 21 in support 15 and thru washer 28. Spring 20 presses against flange 19 and washer 28. This creates compression, which increases as knob 3 is wound upon axis 2. This compression holds rotatable member 1 in predetermined positions in oval slot 21 into which it is brought by lever 14. Rotatable member 1 is made to move around its axis 2 by motor 10 which has on its shaft 12 a pulley 11 with a groove 11a. Rubber belt 9 from pulley 11 to pulley 5 moves rotatable member 1 around its center axis 2 at a constant speed—depending, of course, on the speed of the motor. However, this speed should, preferably, be variable at will, and the motor reversible. The rotatable member 1 is brought by lever 14 into a predetermined position, which makes apertures 7/1 to 7/12 pass in the path of the projection light or visibility of a predetermined part 24 of picture frame 23, disclosing or displaying successive portions of the predetermined part 24.

Thus the rotatable member 1 is functioning as a controlled reader.

When the functions of the controlled reader are not wanted, rotatable member 1 is moved by the use of lever 14 to a predetermined position in oval slot 21; thereby removing it from the sight line of picture frame 23. The apparatus can then be used as a regular projector, or viewer or whatever it may be.

Apart from the apertures 7/1–7/12 rotatable member 1 is provided with twelve square slots numbered 8A to 8L. These slots are disposed on the rotatable member 1, at varying distances from center 2 and represent part of the means for a stepwise rotatable display appliance described below with FIG. 3.

Axis 2 of rotatable member 1 is moved by lever 14 to point 21a in oval slot 21, whereby pulley belt 9 is loosened (see FIG. 4).

Ratchet wheel 6 is attached to rotatable member 1 in a predetermined manner so that as ratchet wheel 6 is moved by one tooth, with means described in FIG. 3 a predetermined square slot from among those numbered under 8A to 8L is brought into alignment with a predetermined part of a similar size and form in the picture frame 23. The latter becomes thereby displayed or projected as the case may be. As the action is repeated a continuous display of parts of a picture is obtained, which in this specification is referred to as stepwise rotatable display appliance. The functions of controlled reader and of the stepwise rotatable display appliance are incorporated in the same rotatable member 1, but can also be produced by two separate rotatable members—one provided with a pulley 5 and the other with a ratchet wheel 6. By removing knob 3, the two rotatable members become interchangeable.

FIGURE 2 represents a plane view and partial side view of means to vary the size of the projection or display frame, as well as means to combine these functions with the function of an opaque mask—tachistoscope. In FIG. 1 the picture frame 23 indicates the size, form and position of this frame. It represents a 35 m./m. film strip or slide frame. In the path of the projection light for frame 23 there is a mask or shutter 36 which is movable in grooves 39/1 and 39/2. This mask is also provided with a flanged pin 37. Pin 37 is held by prong 46, end part of lever 45, which is movable around brace cross 47, imbedded in support 15. Flange 48 holds lever 45 firmly. When electromagnet 52 is energized it pulls its core, which is held by cotter pin 51 connected by bar 50 and cotton pin 49 to deliver 45. This thrust move opaque mask 36 to a point predetermined by the position of blocking pin 45/1. As the energizing of electromagnet 52 is cut off, spring 42, attached at 44 to support 15 and at 43 to the movable mask 36, pulls mask 36 to a point predetermined by the position of cam 53 which is movable around brace cross 54 by handle 56. The latter is also secured by screw 55. Handle 56 presses against graded caliber 57 at point 60, which indicates the display of ¼ picture frame 24. As the energizing of electromagnet 52 is cut off for a short moment, the movable mask 36 is pulled down by spring 42 to display briefly part 24 of projection frame 23. By moving handle 56 of cam 53 from position 60 to position 61 the distance between cam 53 and lever 45 is increased. When electromagnet 52 is not active, mask 36 is pulled down to display ¾ of display frame 23. When electromagnet 52 is energized the display frame is blacked out. By cutting off the electromagnet for a short time, half of the display frame 23 will become displayed for a brief moment. This method of displaying ad libitum, the display frame represents a tachistoscope function. FIGURE 2 illustrates, accordingly, means for combined functions of a variable field display appliance and a tachistoscope. It is evident that instead of using electromagnet 52 lever 45 can be pushed down by hand and released, ad libitum, producing the same tachistoscopic effect.

FIGURE 3 represents a plane view of means to actuate the stepwise rotatable display appliance. Lever 71 is movable around brace cross 72 held in support 15. Brace cross 72 is placed in a predetermined position with relation to ratchet wheel 6 on rotatable member 1, FIG. 1. As rotatable member 1 is functioning as controlled reader, spring 83 held at 82 in support 15 and at 84 in lever 71 up, so as not to obstruct the rotation of rotatable member 1. When it is desired to produce a stepwise rotatable display, motor 10 of FIG. 1 is disengaged from rotatable member 1 by loosening pulley belt 9, as described in FIG. 1.

Tongue 77 moving around brace cross 78 is held resiliently by spring 75, which is attached at 74 to lever 71 and at 76 to tongue 77. Pin 85 in lever 71 limits the predetermined pull of spring 75. As lever 71 is pushed towards ratchet wheel 6, tongue 77 exerts pressure against tooth 6/12 of the ratchet wheel 6, rotating it around its center until tooth 73 of lever 71 comes into contact with the flat side of tooth 6/4, stopping the rotation of ratchet wheel 6 instantly. The sizes of tooth 73 as well as of tongue 77 are predetermined so that the pressure of tooth 73 against the ratchet wheel 6 teeth starts only when pressure of tongue 77 is expended.

FIGURE 4 represents a plane view of means for the combined use of a still picture projector or display apparatus with the functions of variable field display appliance and/or a controlled reader. FIG. 4 illustrates the layout of the means for the 4 above said functions on support 15, part of a still picture projection apparatus.

One of the advantages of this invention is that the above said apparatus can also be used as a still picture display apparatus without the above said functions. In order to do so, electromagnet 52 is disconnected and handle 56 is moved to point 63 on caliber 57. Mask 36 is thereby removed from the visibility path of picture frame 23. Lever 14 is then pushed down to move rotatable member 1 to a predetermined position in oval slot 21, removing thereby rotatable member 1 from the visibility path of picture frame 23. The apparatus is now ready to function as a regular projection or display apparatus. The actuation of the function of controlled reader, stepwise rotatable display appliance, variable field display appliance and tachistoscope are described under FIGS. 1, 2 and 3.

FIGURE 4 illustrates also the means to advance film strip 155 FIG. 16; which is inserted in a film guide (not shown) and pulled by sprocket wheels 243 and 244 and pressure roller (not shown). Spring 246 held by screw 248 on side bar 39/2 presses with its head 247 against the rim of disc 245. There are 16 grooves on that rim, each groove 139 corresponding to one sprocket on the sprocket wheels 243–244. As knob 97 is turned by one sprocket, head 247 enters a groove 139 on rim of disc 245 with an audible click and a change of pressure, easily detected by the operator. At each click ¼ of the film frame is advanced.

FIGURE 5 represents a schematic side view of a film strip projector into which is incorporated a transparent mask tachistoscope.

An opaque tachistoscope has already been described under FIGS. 2 and 4. It is claimed that a transparent type of tachistoscope, wherein texts and other details of subject matter are only blurred and removed from the screen without blacking out, are preferable from an educational and hygienic points of view. Lens 98 has a predetermined refractory power, which, when interposed between the illuminated image in the picture frame 23 and the projection lens 98, blurs the texts or images, when projected on screen. Lens 98 is held firmly in holder 100, which is part of a bar 95 and is hinged at 101 with bar 96. The latter is firmly attached by screw 109 to squared bar 102 bent at two ends and attached by screws 103 and 104 to projection lens tube 111. Spring 110 is attached at 108 to square bar 102 and at 107 to hinged bar 95. Arm 105 is attached by screw 106 to hinged bar 95. When arm 105 is pushed down, it rotates around hinge 101; whereby lens 98 is brought down into recess 99 in projection lens tube 111. Projection lamp 92 illuminates through condenser lenses and heat absorbing glass 93 picture frame 23 of film strip 155. As long as lens 98 is standing, as shown, between picture frame 23 and projection lens 113—the image projected is blurred. As soon as arm 105 is pushed down and lens 98 moved into recess 99 the image projected becomes clear. Arm 105 may be pushed down by hand or by an electromagnet, doing so for a brief moment produces a tachistoscopic effect. FIG. 5 also represents schematically the emplacement of the rotatable member 1 with relation to the source of light 92, the condenser lenses 93, the opening 94 in support 15 for the passage of the light beam, the emplacement of the film strip in the picture frame 23 and the emplacement of the axis 2 in the oval slot 21. Support 15 is shown in a plane view in FIG. 4 with the detailed disposition of various means not shown in this schematic side view. Knob 97 is attached to a sprocket wheel, which is organized to advance for each single sprocket hole with an audible click. Each sprocket hole represents the advance of the film strip by ¼ of its picture frame, in a manner explained in FIG. 4.

FIGURE 6 represents a plane view of a rotatable member 1, which is provided with apertures 167/1–167/12 divided into two sectors wide and narrow. By moving lever 14 the wide or the narrow part of apertures 167/1–12 may be aligned with part 24 of picture frame 23.

It is evident that when the wide part of the aperture is used a wider portion of the part 24 will be displayed. If it is desired, for instance, to display single syllables it may be found advantageous to use the narrow part of the apertures 167/1–12.

FIGURE 7 represents a plane view of a rotatable member 1, which is in all respects similar to the rotatable member 1 shown in FIG. 1 except that the apertures 117/1–117/12 can be varied in their size by moving fingers 118 and 119. The rotatable member 1 is made up of two superimposed discs 1 and 1a. Disc 1 is cut out in the center at 125. Both discs are held together by brace 122 and 123 moving in the slots 121 and 120. By moving finger 118 towards finger 119 the apertures 117/1–117/12 become narrower, but can be adjusted to be wider.

FIGURES 8, 9, 9a and 10 represent carriers of subject matter for projection or display with the apparatuses referred to above—as can readily be seen the carriers illustrated are made up of picture frame of different sizes. Each picture frame illustrated an example of a possibility of a combination of a given size for a different function. But the possibilities of combinations shown in these drawings are only part of a long list. The following describes only some displays of the possible combinations:

(1) Full frame picture;
(2) Full frame picture with tachistoscope;
(3) Full frame picture with one line of text shown with tachistoscope;
(4) Full frame picture with one line of text shown with controlled reader;
(5) Display consecutive equal parts of a full frame picture;
(6) As above, but each with tachistoscope;
(7) ¾ of a full frame picture;
(8) ¾ picture as above—then display it in ¼ size;
(9) ¾ frame picture with one line of text for controlled reader;
(10) ¾ frame picture with tachistoscope.

Some combinations can be repeated for ½ and ¼ picture frames.

The use of these combinations of functions is especially important in a classroom, where variety in the method of presenting subject matter is vital. FIGURE 8 represents a carrier of subject matter in the form of a paper roll 140. FIGURES 9 and 9a represent carriers in the form of slides 130 and 130/1 and FIGURE 10 represents a carrier in the form of a film strip 155.

In view of the numerous combinations of the said functions and variations in the size of picture frames, it is important that advance notice of the character of each oncoming picture frame be given to the operator of the apparatus, to enable him to prepare the manipulation of the levers 14, 71, 56 and 45 shown in FIGS. 4 and 12. Letters A to F on caliber 164 for lever 14; G to K on caliber 58 for lever 56 or cam 53, S, for stepwise, on lever 71 and T, for tachistoscope, on lever 45 indicate the gradation of line of movement or their identity. The same letters plus other indications are used as code signals in each frame of subject matter to indicate to the operator the character of the oncoming subject matter frame and the selection of the lever and their manipulation. The following code signals, as they appear in FIGS. 8, 9, 9a and 10 call for the below enumerated actions by the operator.

(1) Code signal HFPR140a, FIG. 8:

H—move lever 56, FIG. 4, to letter H on caliber 58.
F—move lever 14 to letter F on caliber 164.
PR—prepare students for PR≡Programed Instruction, then turn knob 241 by ¼ frame.

(2) Code signal KALS145, FIG. 8:

K—move lever 56, FIG. 4, to letter K on caliber 58.
A—move lever 14 to letter A on caliber 164.
L—adjust arrow L30, FIG. 4, to face arrow L30 on support 15 and move knob 97 by ¼ frame.
S—actuate lever S71, FIG. 4.

(3) Code signal HFT150, FIG. 8:

H—move lever 56, FIG. 4, to letter H on caliber 58 and turn knob 97 by ¼ frame.
F—move lever 14 to letter F on caliber 164.
T—actuate lever T45, FIG. 4, back and forth for tachistoscopic function.

(4) Code signal HE133, FIG. 9:

H—move lever 56 to letter H and turn knob 97 by ¼ frame.
E—move lever 14 to E162, FIG. 4—clockwise, and start motor 10 for controlled reader movement.

(5) Code signal HER173, FIG. 10:

H—move lever 56 to letter H.
E—move lever 14 to E and turn knob 97 by ¼ frame, and start motor 10 clockwise for controlled reader.
R—train pupils in rhythmical reading with controlled reading.

The manner to manipulate other different size picture frames and the various functions can be inferred from the description of the FIGS. 1, 2, 3 and 4. However, the last example Code HER173, FIG. 10, needs further explanation. As can be seen in FIG. 10 picture frame 184, short syllables represented by short lines are disposed at predetermined distances from each other. When these syllables are read with the controlled reader a rhythmic pattern of enunciation is obtained which (for easier understanding only) is also translated into musical notes.

However, the reverse is possible, namely, musical notes may be at placed predetermined distances in accordance with their time values and enunciated with the controlled reader. In the study of reading by the phonetic system, where frequent and prolonged repetitions are necessary, this rhythmic arrangements may remove boredom from the mechanical repetition. By changing the speed of the controlled reader the rhythm quickens and helps in the acquisition of speed in reading.

FIGURE 11 represents a plane view of alternative means for a variable field display appliance, which may be required preferably for a slide projector.

Bar 27 has cutouts marked 69/1 to 70/3. Bar 27 is held by brackets 34/1 to 34/3 and 35/1 to 35/3, which are attached to support 15. Knob 64 is attached to spur gear 65 held by axis 65/1. Spur gear 65, when rotated, moves rack 67, which is attached by screws 65/1–68/3 to bar 27. As bar 27 moves vertically to the right it is stopped in its movement by protruding ends 32/1 and 32/2. These ends are blocked by pins 33/1 and 33/2. In this last said positon picture frame 23 is completely covered by bar 27 and is blacked out. As knob 64 is turned anti-clockwise bar 27 slides towards the left and cutouts 69/1 to 69/4 are aligned successively with picture frame 23 whereby the upper ¼, ¾ and ¾ of picture frame 23 as well as ¼ of it become displayed. When cutouts 70/1, 70/2 and 70/3 are aligned with picture frame 23 the lower ¼, ¾ and ¾ of picture frame 23 become successively displayed.

These means for the production of the variable field display functions are combined preferably with the transparent movable mask tachistoscope as described under FIGURE 5.

FIGURES 12, 12a to 12e represent various views of a teaching machine, provided with means to function, concurrently or intermittently, as a controlled reader, and/or a tachistoscope and/or a variable field display appliance and/or a stepwise rotatable display appliance. The said means are, in general, identical with those already described herein, regarding the said functions, except for a few changes or additions, which are shown in FIGS. 12, 12a to 12e and which are described below as follows:

(1) FIGURE 12 shows the said teaching machine actuated as a stepwise rotatable display appliance. The drawings of FIG. 12 show two minor differences with FIG. 3.

First, in FIG. 12, ratchet wheel 6 has only 4 teeth corresponding to the apertures 8a to 8d reduced to four, on A./C. of their size.

Second, hook 77a on tongue 77 of lever 71 is added for improved stability of the frame of the displayed image, at the moment, when rotatable member 1 is stopped. Reciprocally, the later improvements are applicable to the means illutsrated in FIGS. 3, and 4.

(2) FIGURE 12 shows the following variants with FIGS. 2 and 4, for the actuation of the variable field display appliance:

Sliding mask 36 is pulled towards cam 53 by springs 42a and b, attached at one end to bar 219 and 219a at points 220 and 220a, said bars being held on sliding mask by screws 221a and 221b, and at the other end attached at points 214 and 214a to bars 213 and 213a, which are held on support 15 by screws 216 and 216a. Sliding mask 36 is made to move in grooves 39/1 and 39/2 by rotating cam 53.

As shown in FIGURE 12 sliding mask 36 is exerting pressure against cam 53 at point K with roller 38. This roller is held by pin 37 imbedded in sliding mask 36. By rotating cam 53 with handle 56 in an anti-clockwise direction, from point K as shown in FIG. 12 to points J, I, H and G, sliding mask 36 is made to slide in grooves 39/1 and 39/2 up to line 23a, varying thereby the size of the display window 23 in the following manner: At point K–a ¼ frame of display window 23, at point J—¾ frame, at point I—½ frame, at point H—¼ frame 24, at point G—sliding mask 36 covering completely display window 23.

Rotatable member 1 is shown on FIG. 12 covering all of the area of display window 23. In order to remove rotatable member 1, handle of lever 14 is moved down until arrow 165 faces letter F163 on calibrated dial 164. Thereby, axis 2 of rotatable member 1 is moved to point 21b in oval slot 21. This removes rotatable member 1 from the view of the display window 23.

FIGURES 12e and 12d illustrate means for an improved actuation of cam 53.

Cam 53 and handle 56 are mounted on rod 54 and held thereon firmly by nut 54b. Rod 54 goes thru washer 222 held on the said rod by pin 222a, then rod 54 goes thru washer 223, which lies flat and firmly attached to support 15, by screws 223a and b FIG. 12d. Rod 54 goes then thru an aperture in support 15, a washer 230, a compression spring 224, a washer 225 and nut 228. By turning this nut on windings in the rod 54, the compression of spring 224 is regulated. This compression holds cam 53 resiliently in positions under pressure of roller 38.

In order to secure, still further, cam 53 in its various positions with relation to roller 38, a small tooth 222b protruding from washer 222 is imbedded at each of the said positions of cam 53 in the respective grooves 223 G, H, I, J, and K in washer 223.

The above described features may also be applied for the means described in FIGURES 1, 2 and 4.

The functions of a tachistoscope are actuated in the teaching machine, FIGURE 12, in conjunction with the means provided for the variable field display appliance, FIGURE 12, in a manner similar to the one described under FIGURES 2 and 4. Electromagnet 52 of FIG. 4 is not shown in FIG. 12 and may, if desired, be dispensed with, as stated in the description of FIGURE 4.

The functions of controlled reader in the teaching machine, FIGURE 12, are actuated in the same manner as described under FIGURE 1 with the following minor changes: The twelve apertures 7/7–7/12 have been reduced to six 7/1–7/6. A calibrated scale 164, FIGURE 12, has been added to guide the operator of the teaching machine in the positioning of the rotatable member 1. Arrow 165 on lever 14 facing arrow 158 letter A on caliber 164 indicates the position of rotatable member 1 for the function of stepwise rotatable display appliance. By moving arrow 165 to face 162 letter E apertures 7/1 to 7/6 are aligned with display window frame 24 for controlled reader. By placing arrow 165 facing 163 letter F, rotatable member 1, is moved out of the visibility path of display window 23.

The above said improvements may also be applied to the means described in FIGURES 1 and 4.

For the functions of the teaching machine, FIGURE 12, as a teaching machine, rotatable member 1, is kept, as above described, out of the visibility path of display window 23, the size of which is adapted to the size of the frames of subject matter as illustrated on paper roll 140 FIGURE 8.

FIGURES 12a, b and c represent the means to move the said paper roll in the said teaching machine. A paper roll containing subject matter for a teaching machine, held on a magazine 206 provided with flanges 208 is inserted with its axis 207 in grooves 239 of container 231. The tapered end 140d FIG. 12c of paper roll 140 is pulled over bridge 204 of container 231 and is then inserted in slot 209 of empty magazine 207a held in grooves 230/1 and provided with knob 211. The first part of paper roll 140 is now laid flat on bridge 204 with its "start" frame upward. Container 231 is held by hinge 205 attached to box 200. As container 231 is pushed up into box 200 the V-formed pressure pads 201 and 201a fit into grooves 239 and 239/1 holding axis 207 and 207a in grooves 239 and 239/1. "Start" frame of paper roll 140 becomes then visible in display window 23 FIG. 12 and 12a. By turning knob 211 paper roll 140 is advanced with its frames of subject matter displayed in display window 23.

It is evident, that all the manual manipulations of the various levers may be replaced by straight and rotary solenoids and actuated by pushbutton control, all within the state of the art.

Having thus described my invention, what I claim and desire to secure by Letters Patent is:

1. A still picture display apparatus comprising a holder for a two-dimensional subject matter carrier, a framing window, an opaque mask and means mounting said mask for selective displacements with relation to the framing window, thereby to form rectangular display sections having the width of the framing window and the height of various predetermined parts of the said window, means to move the subject matter carrier so that a unit of subject matter on the carrier is in optical alignment with the framing window, a rotatable opaque disc having circumferentially narrow apertures distant from its axis of rotation, means to position and rotate the disc so that the apertures pass successively across the framing window, thereby permitting progressive limited portions of the unit of subject matter in the framing window to be displayed, in the frame of a slot moving successively and horizontally, at a continuous pace across a said displayed section of the framing window, a pellucid image-blurring element, means mounting said element for rapid selective movements between a first position in optical alignment with the framing window and a second position out of optical alignment with the framing window thereby to permit various tachistoscopic displays of the subject matter in the said framing window.

2. An optical image projector including a light source for casting a beam of light, a holder for a two-dimensional subject matter carrier, a framing window, an optical system, an opaque mask, and means mounting said mask for selective displacements with relation to the framing window, thereby to form rectangular display sections having the width of the framing window and the height of various predetermined parts of the said window, means to move the subject matter carrier in steps, so that each of its units of various sizes is in optical alignment with a display frame of a related size, a rotatable opaque disc having circumferentially narrow apertures distant from its axis of rotation, means to position and rotate the disc so that the apertures pass successively across the framing window whereby to permit progressive limited portions of the unit of subject matter in the framing window, to be displayed in the frame of a slot, moving successively and horizontally at a continuous pace across a said display section of the framing window, a pellucid image-blurring element, means mounting said element for rapid selective movements between a first position intersecting the optical axis and a second position clear of said optical axis, thereby to permit various tachistoscopic displays of the subject matter in the said framing window.

3. A still picture display apparatus including a holder for a two dimensional subject matter carrier, a framing window, means to move the subject matter carrier in steps, so that each of its units is in optical alignment with the said framing window, a rotatable opaque disc having circumferentially narrow apertures equiangularly spaced at the same radial distances from the disc's axis of rotation and located on the periphery of the disc at predetermined distances, means to position and rotate the disc so that the apertures pass successively across the framing window whereby to permit progressive limited portions of the unit of subject matter in the framing window to be displayed in the frame of a slot moving successively, horizontally and at a continuous pace across the said framing window, the timing between the disappearance of the said moving slot at the end of the framing window and its reappearance at the beginning of the said window being related to the said predetermined distances between the locations of the said apertures.

4. A still picture display apparatus as set forth in claim 3 wherein the apertures of the said rotatable disc are of a width less than the width of the said framing window and are of like size and shape so that similar portions of the unit of subject matter in the framing window are progressively, horizontally and continuously displayed within the frame of the said moving slot.

5. A still picture display apparatus as set forth in claim 3 wherein the apertures of the said rotatable disc are of a width less than the width of the said framing window and of like size and shape permitting thereby the unit of subject matter in the said framing window to be displayed repeatedly within the frame of a slot moving progressively, horizontally and continuously.

6. A still picture display apparatus as set forth in claim 3 wherein the positioning means selectively shifts the axis of rotation of the disc between a first position wherein the apertures, when rotated, pass successively and continuously across the framing window and a second position wherein the apertures are clear of said window.

7. A still picture display apparatus as set forth in claim 3 wherein the apertures located on the periphery of the said rotatable disc have radially stepped radial edges so as to be of varying widths.

8. A still picture display apparatus as set forth in claim 6 wherein the positioning means selectively shifts the axis of rotation of the disc to intermediate positions between the first and second positions so that the apertures of a predetermined size pass successively across the framing window at various selected elevations.

9. A still picture display apparatus as set forth in claim 3 wherein manually operable means is provided to simultaneously vary the width of the said apertures, said means comprising an element adjacent and coaxial to the disc, means mounting the element for circumferential movement relative to the disc so that in a first position the apertures in the disc are partially blocked by the element and in a last position the element is clear of said apertures.

10. A still picture display apparatus as set forth in claim 3 wherein motor means selectively rotates the disc in a clockwise or counterclockwise direction, permitting thereby the selective display of portions of subject matter in the frame of a slot moving selectively in two directions, left to right and right to left.

11. A still picture display apparatus as set forth in claim 3 wherein motor means selectively rotates the disc at selectively variable speeds, permitting thereby the selective display of portions of subject matter in the frame of a slot moving across the said framing window at speeds adaptable selectively for beginners and advanced students.

12. An optical still image projector provided with a light source for casting a beam of light, a holder for a two dimensional subject matter carrier, a framing window, an optical system including means to modulate the light beam in accordance with the subject matter in the framing window and to project the modulated beam along an optical axis passing through said framing window, a pellucid image blurring element secured on a movable support mounted for rotation about an axis transverse to and spaced from the optical axis, moving between a first position intersecting the optical axis and a second position clear of said optical axis, thereby permitting tachistoscopic projections of the subject in the said framing window.

13. An optical still image projector as set forth in claim 12 wherein biasing means urges the said image blurring element to one of the said positions.

14. A still picture display apparatus including a holder for a two dimensional subject matter carrier, a framing window, means to move the subject matter carrier so that a unit of subject matter on the carrier is in optical alignment with the framing window, an opaque rotatable disc having circumferentially narrow apertures distant from its axis of rotation, means to position and rotate the disc so that the apertures pass successively across the framing window whereby to permit progressive limited portions of the unit of subject matter to be displayed in the framing window, an opaque mask and means mounting said mask for selective movement across the framing window in a direction transverse to the movement of the apertures across said window so as to combine the effect of the apertures, passing across the rectangle, created by the edge of the mask and the opposite edge of the window, into a slot moving continuously, successively and horizontally for the display of limited portions of the unit of subject matter in the framing window.

15. A system for the visual presentation of subject matter with a still picture display apparatus as set forth in claim 1 wherein units of the said subject matter carrier are organized into frames of various sizes, some units comprising frames corresponding to the size of the framing window and other units comprising frames corresponding to the various predetermined sizes of the said display sections for display within the said sections and wherein the units of the subject matter carrier carry in the said frames of various sizes subject matter of various content such as standard pictorial, programmed teaching, tachistoscopic and controlled reading material for display in various sequences and in frames of various sizes.

16. A system for the visual presentation of subject matter with a still picture display apparatus as set forth in claim 15 wherein for the display of subject matter as standard pictorial and programmed teaching material in frames of various sizes, signals are provided indicating the actuation of means provided to keep the said rotatable disc and blurring element out of optical alignment with the framing window, as well as the actuation of means mounting the opaque mask for selective displacements with relation to the framing window, thereby to form rectangular display sections having the width of the framing window and the height of various predetermined parts of of the said window for the display therein of standard pictorial and programmed teaching material in frames of various sizes.

17. A system for the presentation of subject matter with a still picture display apparatus as set forth in claim 15 wherein for the display of subject matter as tachistoscopic material signals are provided indicating the actuation of means provided to position the blurring element in optical elignment with the framing window, keep the rotatable disc out of optical alignment with the framing window as well as mount the opaque mask for selective displacements across the framing window, thereby to form rectangular display sections having the width of the framing window and the height of various predetermined parts of the said window for the tachistoscopic display therein of the said units of subject matter in frames of various sizes.

18. A system for the visual presentation of subject matter with a still picture display apparatus as set forth in claim 15 wherein for the display of the subject matter as controlled reading, signals are provided indicating the actuation of means to keep the blurring element out of optical alignment with the framing window, to position and rotate the rotatable disc so that the apertures pass successively across the framing window, and to mount the opaque disc for selective movement across the framing window in a direction transverse to the movement of the apertures, so as to combine the effect of the apertures passing across the rectangle created by the edge of the mask and the opposite edge of the window into a slot moving continuously, successively and horizontally displaying limited portions of the unit of subject matter in the framing window.

19. A system for the visual presentation of subject matter with a still picture display apparatus as set forth in claim 2 wherein units of the said subject matter carrier are organized into frames of various sizes, some units comprising frames corresponding to the size of the framing window and other units comprising frames corresponding to the various predetermined sizes of the said display sections for display within the said sections and wherein the units of the subject matter carrier carry in the said frames of various sizes subject matter of various content such as standard pictorial, programmed teaching, tachistoscopic and controlled reading material for display in various sequences and in frames of various sizes.

20. A system for the visual presentation of subject matter with a still picture display apparatus as set forth in claim 19 wherein for the display of subject matter as standard pictorial and programmed teaching material in frames of various sizes, signals are provided indicating the actuation of means provided to keep the said rotatable disc and blurring element out of alignment with the framing window, as well as the actuation of means mounting the opaque mask for selective displacements with relation to the framing window, thereby to form rectangular display sections having the width of the framing window and the height of various predetermined parts of the said window, for the display therein of standard pictorial and programmed teaching material in frames of various sizes.

21. A system for the visual presentation of subject matter with a still picture display apparatus as set forth in claim 19, wherein, for the display of the subject matter as controlled reading material, signals are provided indicating the actuation of means provided to keep the blurring element out of optical alignment with the framing window, to position and rotate the rotatable disc so that the apertures pass successively across the framing window, to mount the opaque disc for selective movement across the framing window in a direction transverse to the movement of the apertures, so as to combine the effect of the apertures passing across the rectangle created by the edge of the mask and the opposite edge of the window into a slot moving continuously, successively and horizontally displaying limited portions of the unit of subject matter in the framing window.

22. A system for the visual presentation of subject matter with a still picture display apparatus as set forth in claim 19 wherein, for the display of subject matter as tachistoscopic material signals are provided indicating the actuation of means provided to position the blurring element in optical alignment with the framing window, keep the rotatable disc out of optical alignment with the framing window as well as mount the opaque mask for selective displacements across the framing window, thereby to form rectangular display sections having the width of the framing window and the height of various predetermined parts of the said window for the tachistoscopic display therein of the said units of subject matter in frames of various sizes.

23. A two dimensional subject matter carrier for display with a still picture display apparatus as set forth in claim 1, wherein said subject matter carirer is organized into units of various sizes, some units corresponding to the size of the framing window and other units corresponding to the various predetermined sizes of the said display sections for display within the said sections.

24. A two dimensional subject matter carrier for display with an optical image projector as set forth in claim 2, wherein said subject matter carrier is organized into units of various sizes, some units corresponding to the size of the framing window and other units corresponding to the various predetermined sizes of the said display sections for display within the said sections.

25. A filmstrip for display with a filmstrip projector as set forth in claim 2, wherein said filmstrip is organized into units of various sizes, some units having standard four sprocket holes and other units having less than four sprocket holes for projection within the said display sections of the framing window.

26. A two dimensional subject matter carrier as set forth in claim 23, wherein said carrier may be of any pliable or rigid still picture display material.

References Cited
UNITED STATES PATENTS

| | | | |
|---|---|---|---|
| 1,596,046 | 8/1926 | Kahn | 352—24 |
| 2,737,082 | 3/1956 | Dowling | 88—24 |
| 2,813,468 | 11/1957 | Jones | 352—236 |
| 2,887,006 | 5/1959 | Yale | 88—27 |
| 3,018,686 | 1/1962 | Kurz | 88—27 |
| 3,195,403 | 7/1965 | Ascanio et al. | 88—26 |

NORTON ANSHER, *Primary Examiner.*

R. A. WINTERCORN, H. H. FLANDERS,
*Assistant Examiners.*